July 11, 1933.  F. W. DWYER  1,917,637
GAUGE
Filed Feb. 24, 1931
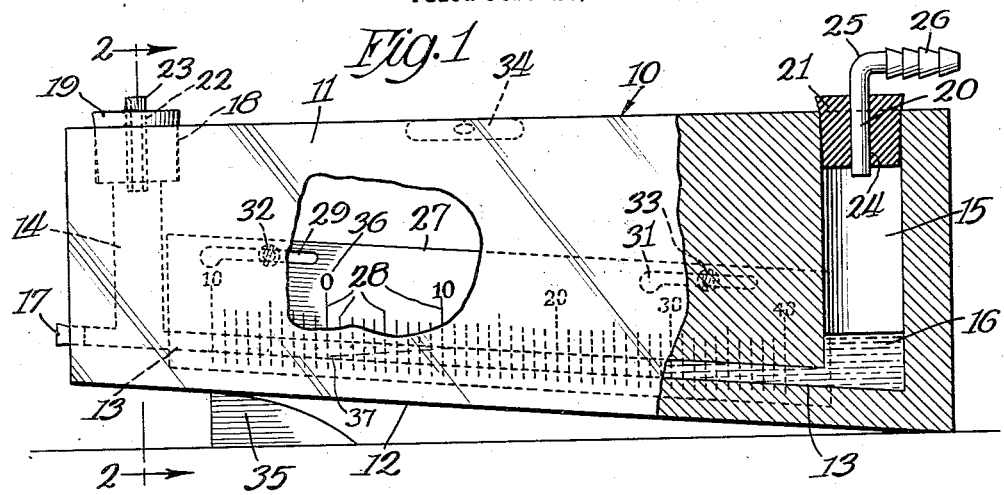
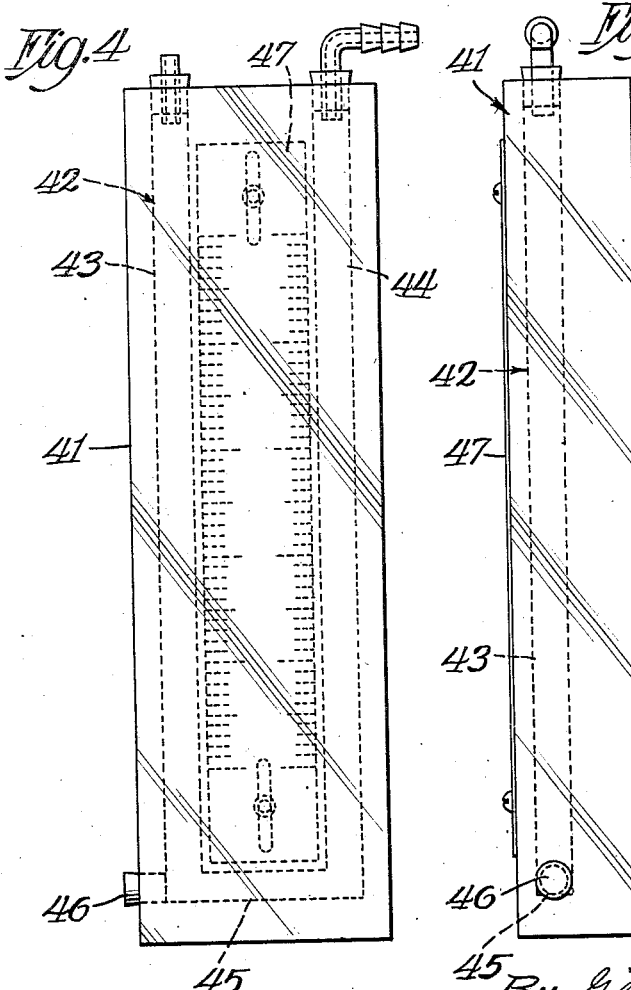
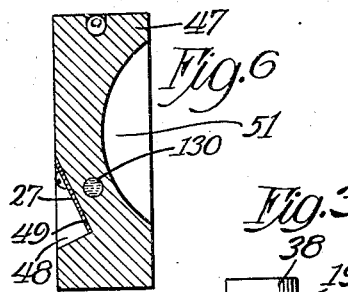
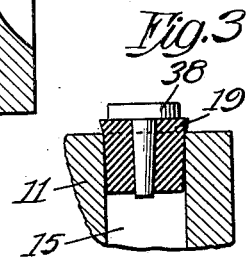
Inventor
Frank W. Dwyer
By Gibson, Irwin & Cox Attys.

Patented July 11, 1933

1,917,637

UNITED STATES PATENT OFFICE

FRANK W. DWYER, OF OAK PARK, ILLINOIS

GAUGE

Application filed February 24, 1931. Serial No. 517,650.

This invention relates to gauges, and more particularly to gauges for determining sub-atmospheric and super-atmospheric pressures of gases.

One of the objects of the invention is the provision of a gauge in which the liquid columns are protected against injury by being located within the body of the gauge.

Another object of the invention is the provision of a transparent gauge body member having bores for the indicating liquid within the member itself.

A further object of the invention is the provision of a transparent gauge with a graduated scale so arranged that the readings on the scale may be readily made.

Another object of the invention is the provision of a gauge that is inexpensive to manufacture, simple in construction, accurate in operation, and that is not likely to become broken or get out of order.

Other and further objects and advantages of the invention will appear from the following description taken in connection with the accompanying drawing, in which Fig. 1 is a side elevation of the instrument, with parts in section and parts broken away;

Fig. 2 is a section on line 2—2 of Fig. 1;

Fig. 3 is a similar section of a portion of the gauge with the stopper in position therein;

Fig. 4 is a side elevation of a modified form of construction;

Fig. 5 is a view at right angles to that shown in Fig. 4; and

Fig. 6 is a transverse section of a modified construction of the form shown in Fig. 1.

In the construction of gauges for measuring gas pressures it is common practice to provide a container for the indicating liquid that is separate from the body of the gauge. It is usually of glass with a fine bore. In such devices it is necessary to calibrate each instrument individually because of inequalities in the diameters of the bores. This entails considerable expense. Furthermore, since the tube is exposed it is not infrequently broken, thus incurring considerable expense in repairing the instrument.

The present invention seeks to eliminate this difficulty by making the body of the gauge of transparent material and boring the passages for containing the indicating liquid. By boring the passages accuracy is insured and the gauges may be manufactured on a production basis, thereby greatly reducing the cost of manufacture as well as standardizing the instruments.

Referring now to Figs. 1 to 3 of the drawing, in which is disclosed one embodiment of the invention, which is by way of example only, the reference character 10 designates generally the gauge which comprises the block or body member 11 of transparent material. Any suitable transparent material may be used, such for instance as celluloid, or plastic condensation products such as bakelite, phthalic anhydride, ureaic condensate and the like. This body member may be of any suitable form or shape, that shown being rectangular in cross-section. The body member is provided with a longitudinally extending bore 13 which is adapted to be in an inclined position when the device is in use, whereby the readings can be taken from the liquid in this passage.

The body member is also provided with transverse bores 14 and 15 which, when in use, extend vertically from the ends of the bore 13 and are in communication therewith. The bores 13, 14 and 15 constitute what may be termed a U-shaped passage for containing the indicating liquid 16. The bore 15 of the U-passage is preferably considerably enlarged and forms a reservoir for the liquid 16.

In the formation of the device, the bore or passage 13 may be drilled from one end of the member 11 at an acute angle to the bore 15, whereby when in use the end of the liquid column will be within the passage 13. This passage inclines upwardly toward what for convenience will be termed the outer end of the body member, and in order to conserve material the lower portion of the outer end of the body member may be cut away to form an inclined bottom wall 12. The passage 13 is adapted to be closed by a suitable plug or stopper 17. The bores 14 and 15 are drilled from the top of the body member 11; the bore 14 is counterbored as at 18 for receiving a plug 19 which is interchangeable with the plug 21 inserted in the outer end of the bore 15. The plugs 17, 19 and 21 may be of any suitable material, such as rubber, cork or the like.

The plug 19 is provided with an opening 22 in which is adapted to be mounted an air vent member 23. The member 23 is provided with a small air passage extending longitudinally thereof for constituting a vent for the bore 14. The plug 21 is provided with an opening 24 extending longitudinally thereof and is adapted to receive one end 20 of a hose connector 25. The opposite end 26 of the connector 25 is adapted to be attached to the usual metal tube insertable in the draft space.

The body portion 11 is provided with a scale to indicate the pressure. Any suitable arrangement may be used for this purpose. In the construction shown, which is by way of example only, a separate scale member 27 provided with a scale thereon is employed. This member is preferably, though not necessarily, adjustable on the gauge. When in the position shown in Fig. 1 this member is preferably mounted on the farther side so that the graduations 28 may be read through the body member 11. Any suitable mechanism is provided for slidably mounting this scale member on the side of the body member 11. As shown, the scale member is provided with a pair of slots 29 and 31 respectively through which screws 32 and 33 extend. The body portion is provided with threaded openings for receiving the screws. The gauge is also provided with a spirit level 34 for indicating the horizontal position of the upper surface of the instrument. A leveling block 35 is provided for supporting what for convenience will be termed the outer end or the end opposite the reservoir 15, for properly leveling the instrument.

In the use of the device the instrument is properly leveled and the scale member 27 is adjusted so that the zero graduation mark 36 will be opposite the outer end 37 of the liquid column in the passage 13. The metal tube is then placed in the draft or space in which the pressure is to be tested, and if this space is at sub-atmospheric pressure the end 37 of the liquid column will move to the right in Fig. 1 and its position will be indicated by the scale at the right of the zero point 36.

If the space is at super-atmospheric pressure the liquid column will move to the left, and its reading will be indicated on the scale at the left of the zero point 36.

When the instrument is not in use, the members 23 and 25 may be withdrawn and suitable stoppers 38 may be inserted in the plugs 19 and 21 as indicated in Fig. 3 of the drawing for preventing the escape of the liquid.

The form of construction shown in Figs. 4 and 5 differs from that shown in Figs. 1 and 2 in that the body of the instrument 41 is supported on its end during use. In this form of construction the body 41 is of transparent material as in the former construction, and a U-shaped passage 42 is provided in the block. The two legs 43 and 44 of this passage extend vertically and are open at their upper ends. The connecting passage 45 extends substantially horizontally across the lower portion of the body member 41 and is made by drilling from the side, the opening being closed by a suitable plug or stopper 46. The scale 47 is adjustably mounted on the body portion as in the previous construction and the readings are substantially the same. In this case the readings are taken from the height of the liquid in the leg 43.

In Fig. 6 is shown a modified form of construction in which the block or body member 47 of transparent material, differs from the corresponding body member 11 in Fig. 1 in that one side of the body member is provided with a recess 48 having an inclined surface 49 to which is adjustably mounted the graduated scale 27. The front side of the body member 47 may also be provided with a recess 51, the inner marginal wall of which is adjacent to the bore 130. By removing portions of the body member at each side thereof, light may more easily penetrate the same, whereby the graduations of the scale may be easily read, even though in time the material of which the body member is composed may become clouded or its transparency, for some reason, impaired. By arranging the scale 27 at an angle the same may be read from a point above the instrument.

While the scale 27, see Fig. 1, is graduated in both directions from the zero point 36 it is evident that the zero point could be located at the outer end of the scale, and when it is desired to measure super-atmospheric pressures the tube connector 25 is attached to the plug 19. The readings then will be indicated on the scale in the same manner as when the pressures are sub-atmospheric with the connector 25 in position in the plug 21 as shown in Fig. 1.

I claim as my invention:

1. A gauge comprising a block of transparent material having a U-shape bore therein, the legs of said U extending upwardly and being of unequal diameter, and each of a diameter greater than the connecting portion of said U, the ends of said bore being of substantially the same diameter, interchangeable plugs for said bore, and a graduated scale member adjustably mounted on said block.

2. A gauge comprising a block of transparent material having a U-shape bore therein, for containing a liquid, a graduated scale, and means for adjustably mounting said scale on one side of said block whereby the graduations may be read through said block.

3. A fluid pressure gauge comprising a block of transparent material having a bore of uniform diameter drilled therein, one end of said bore being in communication with a reservoir drilled in said block for containing an indicating liquid, said reservoir extending upwardly at an angle to said bore and opening to the atmosphere, the opposite end of said bore being in communication with a second bore drilled in said block, said last named bore extending upwardly from said first named bore and opening to the atmosphere, and a graduated scale located on the back of said block and visible through the same for indicating the position of said liquid in one of said bores.

4. A fluid pressure gauge comprising a block of transparent material capable of being drilled, a substantially U-shaped passage drilled therein for containing an indicating liquid, the end portions of said passages extending to the surface of said block, an indicating liquid in said passage, a graduated scale on said block for indicating the position of said liquid in one of said bores, and means for connecting a conduit to one end of said passage for applying suction or pressure to said liquid through said conduit and removable means for placing the opposite end of said passage in communication with the atmosphere.

5. A fluid pressure gauge comprising a body member of transparent material, a bore extending longitudinally of said body member, bores extending upwardly from the ends of said first-named bore, said body member having recesses at each side thereof, the inner marginal walls of said recesses being adjacent to said first-named bore, and a graduated scale arranged in one of said recesses at an angle to the side of said body portion whereby the graduations thereon may be read from a point above the body member.

6. A fluid pressure gauge comprising a block of material having a substantially U-shaped passage therein, the ends of said passage extending to the exterior of said block, said passage adapted to contain a pressure indicating liquid therein, means on said block for indicating the position of said liquid in said passage, said material being transparent, whereby said liquid and means are visible through said block, means whereby one end of said passage may be placed in communication with the atmosphere and means for simultaneously placing the other end of said passage in communication with a source of pressure to be measured.

7. A fluid pressure gauge comprising a block of material capable of being drilled, an inclined passage extending longitudinally of the block and drilled therein, a reservoir drilled in said block and extending transversely thereof, said reservoir adapted to contain an indicating liquid and being in communication with one end of said passage, the opposite end of said passage adapted to be placed in communication with the atmosphere and an indicating scale on said block said block being transparent whereby said scale and passage may be observed simultaneously for indicating the position of the indicating liquid in said passage, a level device carried by said block, and means for placing said reservoir in communication with a source of pressure to be measured.

In testimony whereof I affix my signature.

FRANK W. DWYER.